United States Patent Office 3,358,525
Patented Dec. 19, 1967

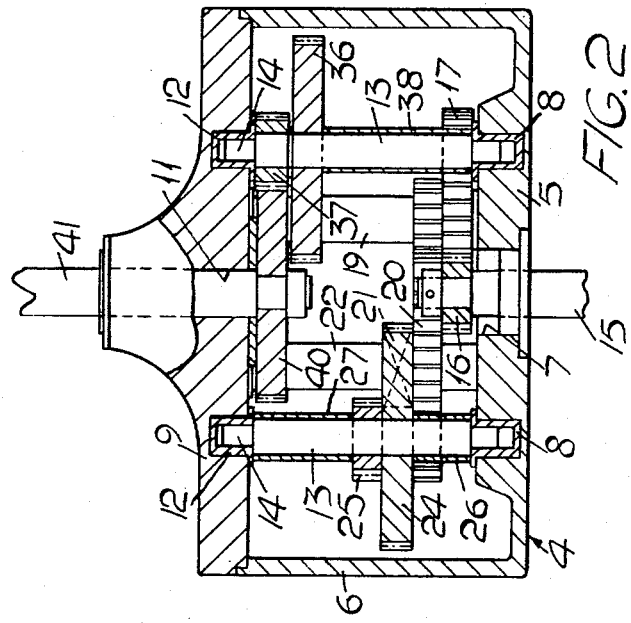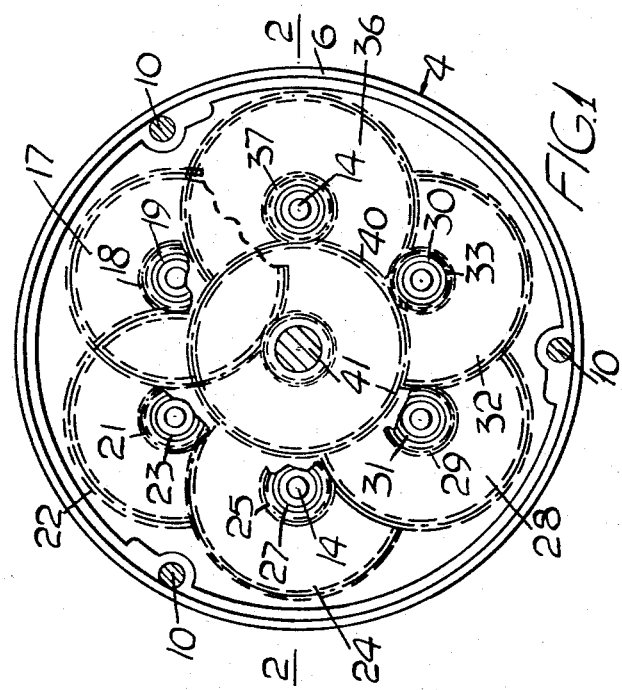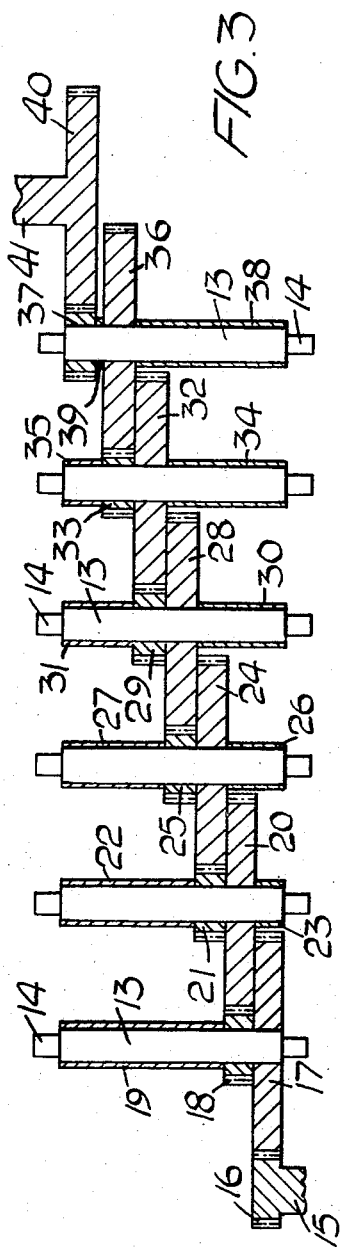

3,358,525
GEARBOXES
George Clarke, Birmingham, England, assignor to Olsen Clarke (Gears) Limited, Birmingham, England
Filed Mar. 30, 1965, Ser. No. 443,857
4 Claims. (Cl. 74—331)

This invention relates to gearboxes and has as an object the provision of a gearbox in a convenient form.

A gearbox in accordance with the invention comprises a housing, a detachable cover, a rotatable input gear and a rotatable output gear which is co-axial with the input gear, a plurality of pairs of bearings equi-angularly spaced around the common axis of the input and output gears, the two bearings of each pair comprising a bearing on the housing and an aligned bearing on the cover, a plurality of lay shafts adapted at their ends to be supported by the pairs of bearings respectively, a plurality of pinions and spur gears which are detachably and non-rotatably mounted on said lay shafts and spacer means also detachably mounted on said lay shafts for the locating of the pinions and spur gears at predetermined axial positions on the lay shafts, whereby various gear ratios between the input and output gears can be obtained by employing different combinations of intermeshing pinions and spur gears mounted on one or more of said lay shafts.

Preferably six pairs of bearings are provided and are spaced apart by 60° around the common axis of the input and output gears so that the axis of each pair of bearings is equidistant from the axes of the two adjacent pairs of bearings and from the common axis of the input and output gears.

The invention will now be more particularly described with reference to the accompanying drawings in which:

FIGURE 1 is a plan view of one example of a gearbox in accordance with the invention shown with its cover removed for clarity.

FIGURE 2 is a section on the line 2—2 in FIGURE 1 and

FIGURE 3 is a diagrammatic developed view showing the entire gear train.

In the example shown the gearbox includes a housing 4 which comprises a base 5 and a cylindrical wall 6 so that the housing 4 is open at the end of the wall 6 remote from the base 5. Formed in the base 5 is a central bore 7 and mounted on the inner side of the base 5 are six bearings 8 which are equally spaced around the circumference of a circle of radius struck from the axis of the central bore. Thus each bearing 8 is equidistant from each of its neighbours and from the axis of the central bore 7. The cylindrical wall 6 is formed around its free edge with a plurality of tapped holes, the axes of which extend in directions parallel to the axes of the central bore in the base.

There is also provided a detachable cover 9 which is secured to the housing 4 by means of screws 10 coacting with the above mentioned tapped holes. The cover 9 is provided with a central bore 11 and with six bearings 12 which are aligned respectively with the six bearings 8 on the housing 4 when the cover 9 is in position on the housing 4.

Six lay shafts 13 are also provided, each lay shaft being formed at its two ends with a portion of reduced diameter 14. The intermediate portion of each lay shaft 13 is splined or otherwise formed to a non-circular cross-section and each lay shaft 13 can be mounted between the base 5 of the housing 4 and the cover 9, with the two reduced end portions 14 entering respectively into a bearing 8 on the housing 4 and a bearing 12 on the cover 9 so that the axis of the lay shaft 13 extends in a direction parallel to the common axis of the central bores 7, 11 in the housing 4 and the cover 9.

In the example shown all six lay shafts are actually in use to provide a very high reduction ratio. Each lay shaft 13 carries an assembly of a spur gear and a pinion and one or two spacing sleeves. Mounted in the bore 7 is an input shaft 15 which carries an input gear 16. This gear 16 meshes with a first spur gear 17 on a first of the shafts 13. This shaft also carries a first pinion 18 and a sleeve 19. The spur 17 and the pinion 18 are both splined internally to fit the shaft and the sleeve 19 may be plain or splined internally.

The second shaft carries a spur 20 and a pinion 21 as well as a sleeve 22 which supports the spur 20 above the spur 17 and a sleeve 23. The third shaft has a spur 24, a pinion 25, a sleeve 26 and a sleeve 27, the fourth shaft has a spur 28, a pinion 29, a sleeve 30, and a sleeve 31 and the fifth shaft has a spur 32, a pinion 33, a sleeve 34 and sleeve 35. Finally the sixth shaft has a spur 36, a pinion 37, sleeve 38, and a small sleeve 39. The pinions 18, 21, 25, 29 and 33 are meshed respectively with the spurs 20, 24, 28, 32 and 36, whilst pinion 37 is meshed with an output gear 40 mounted on an outshaft 41 running in bore 11 in the cover. Thus there are seven stages of reduction and each stage may be varied by employing a different spur/pinion combination, provided the sum of the pitch radii of the spur and co-acting pinion is equal to the spacing of the bearings 8 from the bore 7.

Moreover where a suitable reduction ratio can be obtained by so doing, only one lay shaft need be employed. With the components shown this effect could be accomplished by omitting pinion 18 and the five shafts not required and by placing pinion 37 directly on the end of the first shaft. If two shafts are required the pinion 21 would be omitted together with the other shafts and pinion 37 would be placed on the end of the second shaft adjacent the cover. Similarly the same principle can be applied to three, four or five shafts.

Thus it will be appreciated that, by employing a construction as above described, it is possible to produce gearboxes with widely varied reduction ratios whilst employing relatively few basic components. If, for example, a manufacturer is designing a piece of equipment including a gearbox, but is unsure what reduction ratio should be employed, it is a simple matter for him to vary the ratio without having to construct a completely new gearbox for each variation. Similarly a manufacturer whose customers require gearboxes of widely varied reduction ratios will find the construction described of great advantage.

Having thus described my invention what I claim as new and desire to secure by Letters Patent is:

1. A gear box comprising a housing, a detachable cover secured to said housing, a rotatable input gear and a rotatable output gear which is co-axial with the input gear, a plurality of bearings equi-angularly spaced around the common axis of the input and output gears, the two bearings of each pair comprising a bearing on the housing and an aligned bearing on the cover, a plurality of lay shafts adapted at their ends to be rotatably supported by the pairs of bearings respectively, each lay shaft having an intermediate portion of constant non-circular cross-section, a plurality of separate pinions and a plurality of separate spur gears detachably and non-rotatably mounted on said lay shafts and positionable at any axial position thereon, and separate spacing means detachably mounted on said lay shafts for locating the pinions and spur gears at predetermined axial positions thereon, whereby various gear ratios between the input and output gears can be obtained by employing different combinations of intermeshing pinions and spur gears mounted on one or more of said lay shafts.

2. A gear box as claimed in claim 1 in which six pairs of bearings are employed, such bearings being equally spaced around a circle of radius struck from the common axis of the input and output gears.

3. A gear box as claimed in claim 2 wherein said spacer means comprises loose sleeves on said lay shafts.

4. A gear box as claimed in claim 2 wherein the shafts are splined and the spur gears and pinions have central splined holes.

References Cited

UNITED STATES PATENTS

| 2,881,626 | 4/1959 | Morris | 73—325 X |
| 3,113,468 | 12/1963 | Humphrey | 74—331 X |
| 3,244,024 | 4/1966 | Flowers | 74—331 X |

MILTON KAUFMAN, *Primary Examiner.*

DAVID J. WILLIAMOWSKY, FRED C. MATTERN, *Examiners.*

C. J. HUSAR, *Assistant Examiner.*